3,752,675
INCORPORATION OF NON-WHEAT GRAIN OR TUBER FLOURS OR STARCHES IN WHEAT FLOUR BASED BREAD, BAKED OR FRIED DOUGH GOODS
Cho C. Tsen and William J. Hoover, Manhattan, Kans., assignors to Kansas State University Research Foundation, Manhattan, Kans.
No Drawing. Filed Oct. 5, 1970, Ser. No. 78,238
Int. Cl. A21d *2/16, 13/04*
U.S. Cl. 99—91                                         20 Claims

ABSTRACT OF THE DISCLOSURE

A method of permitting non-wheat grain or tuber flours or starches to be incorporated in wheat flour based bread, baked or fried goods doughs at levels which would deleteriously affect the quality of products prepared from the supplemented dough by introduction of 0.1% to 3% of an additive selected from the group of sodium salts of acyl lactylates of $C_{14}$–$C_{22}$ fatty acids, and the condensation product of from 10–95 parts by weight of ethylene oxide and correspondingly from 90–5 parts by weight of a partial glycerol ester by a $C_{10}$–$C_{24}$ fatty acid containing at least 10 weight percent monoglyceride content with diglycerides, triglycerides and glycerine the balance. The supplement may be added at levels as high as 40% wheat flour weight by use of 0.5% of the additive. A protein source material may also be added to supplement the protein content of a product prepared from the supplemented dough so long as the additive is present therein.

---

This invention relates to a process for permitting non-wheat grain or tuber flours or starches to be added to wheat flour based bread, baked or fried goods at relatively high levels which would deleteriously affect the quality of the food products if it were not for the introduction of an additive into the dough comprising either sodium salts of acyl lactylates of $C_{14}$–$C_{22}$ fatty acids, or an ethoxylated glyceride. If desired, the process also lends itself to introduction of protein supplements into the dough formulations without adversely affecting the quality of the baked or fried goods produced therefrom, thus permitting use of non-wheat flour additives primarily of a starchy nature in the wheat flour based product without sacrifice of the nutritive value of the foods.

Wheat flour based bread, baked or fried goods are staple foods in many countries of the world because of their relatively high caloric value, ready availability of wheat flour at an economical price, and the attractive organoleptic and appearance properties of the food products. Bread dough typically contains wheat flour, water, salt, yeast and sugar with dough conditioning agents and shortening being added in some countries of the world. Frequently milk or milk solids are added. It is frequently desirable or necessary to incorporate supplements in the bread, baked or fried goods formulations for flavor purposes, to decrease the cost of the product since non-wheat grain or tuber flours or starches are oftentimes less expensive than wheat flour as an indigenous crop of a particular country, or as a replacement for a part of the wheat flour in those areas of the world where wheat must be imported and paid for in foreign currency.

Generally speaking though, any dilution of the concentration of wheat flour in the product has an adverse effect on the quality of foods produced from the dough formulation by virtue of weakening of the flour system of the products and particularly the gluten content thereof. Although limited amounts of non-wheat grain or tuber flours or starches may be added to wheat flour based doughs without significantly affecting the quality of the food products prepared therefrom, any addition of a diluent for the wheat flour has some effect on the overall quality of products produced therefrom, with the degree of adverse effect being related to the proportion of supplement present compared with the wheat flour content of the bread, baked or fried dough goods. Since the addition of a non-wheat flour supplement normally involves a decrease in the total protein content of the final products produced from the dough, even though the total caloric value of the products may not be decreased, it is also desirable that the nutritional content of the bread, or other wheat flour based foods be returned at least to the level of products based entirely on wheat flour as the prime ingredient, and preferably fortified with protein to a level exceeding that of conventional wheat flour based bread, baked or fried goods. It has long been recognized though that incorporation of protein supplements into wheat flour based doughs had the same effect on the quality and organoleptic properties of the foods as supplementation with non-wheat grain or tuber flours or starches, since the protein material also had the effect of diluting the wheat flour content of the dough formulation and thus weakening the system. Soy flour for example is an especially attractive protein supplement for flour based baked products such as bread, biscuits or rolls, crackers and fried dough goods such as doughnuts because of the high content of good nutritional quality protein in soy flour and the fact that such flour is available at a sufficiently economical price with respect to the cost of wheat flour, to permit substitution of soy flour for a part of the wheat flour normally introduced as an ingredient of the dough composition.

Supplementation of wheat flour based bread, baked or fried goods doughs with non-wheat flour materials high in starch or protein has not heretofore been successful because of the adverse effect on the quality of the food product produced therefrom and directly attributable to the supplement added. Not only has it been found that the non-wheat flour starch or protein additives deleteriously affect the organoleptic properties of the food products prepared therefrom, but they also detract from the appearance or physical quality and shelf life of the baked or fried goods. Thus, in order for a non-wheat grain or tuber flour or starch supplement to be commercially practical as an additive for bread, baked or fried dough products the supplement must be economical, uniform in quality, and should not significantly change the bread making or baked or fried product producing properties of the dough, or require adjustment in the overall formula. Finally, the supplement should not alter or impair the quality of the bread, or baked or fried dough goods. The same is true as to a protein additive to be incorporated into the dough formulation in conjunction with the non-wheat flour supplement.

Although a wide variety of non-wheat grain or tuber flour or starch supplements may be used as additives for wheat flour based bread, baked or fried dough products, the most useful supplements are selected from the group consisting of rye flour, barley flour, corn flour, cassava flour, yam flour, potato flour, rice flour, wheat starch, yam starch, corn starch, cassava starch, rice starch, potato starch, pregelatinized flours or starches of the supplement sources listed, and mixtures of any two or more of the specified supplements. Up to about 40% (baker's weight) of the non-wheat flour supplement may be added with the supplement usually being present at a concentration of at least 3% (baker's weight) in the formulation, and usually 20% to 30% with the latter being preferred. Baker's weight as used herein means the parts of the additive present for each 100 parts of wheat flour.

Insofar as protein supplementation of the food products is concerned, soy flour is an especially valuable additive for bread, baker and fried dough goods not only because of its high protein content but also by virtue of the fact that it contains 3.2% to 3.8% lysine as compared with 0.375% in wheat flour. Thus, with the addition of 12 grams of soy flour to 100 grams of wheat flour the lysine content of this mixture will be more than doubled to a value of from 0.76% to 0.83%. The resulting product provides an exceptional vehicle for nutritional improvement of human diet. Although enrichment programs providing for the addition of vitamins and minerals have been successfully used for many years, provision of additional protein in the diet at a low cost has thus far evaded really successful implementation. This is true despite the fact that protein, both quantity and nutritional quality, is the most needed nutrient to improve man's diet. However, it has heretofore been found that the addition of any non-wheat protein or high protein wheat derived product to bread, baked or fried dough goods in an amount necessary to significantly improve its nutritive value caused a loss in specific volume of the product, produced poorer texture and resulted in a general loss of organoleptic qualities. This effect was found to increase when an attempt was made at the same time to add a non-wheat grain or tuber flour or starch as a supplement for part of the normal wheat flour content of the food product.

It has now been discovered that by incorporation of from 0.1% to 3% of a sodium salt of an acyl lactylate of $C_{14}$–$C_{22}$ fatty acids (preferably sodium stearolyl-2-lactylate), or an ethoxylated glyceride such as the condensation product of from 10–95 parts by weight of ethylene oxide and correspondingly from 90–5 parts by weight of a partial glycerol ester of a $C_{10}$–$C_{24}$ fatty acid containing at least 10% monoglyceride content with diglycerides, triglycerides and glycerine constituting the balance (preferably polyoxyethylene (20) mono- and diglycerides of $C_{14}$–$C_{18}$ fatty acids having an acid number with the range of 0–2, an hydroxyl number of 65–80, a saponification number of 65–75 and an oxyethylene content of 60.5%–65.%) in the bread or other baked or fried goods dough, a sufficient amount of a non-wheat grain or tuber flour or starch supplement may be added to the composition in amounts to provide required flavor characteristics or caloric replacement for the wheat flour omitted from the formulations, while at the same time allowing non-wheat or wheat protein supplements to be added to the composition in proportions sufficient to compensate for the protein loss attributable to decrease of the wheat flour content of the formulation or to even improve the nutritive quality of the bread, baked or fried dough goods without a subsequent loss in specific volume, physical properties or organoleptic characteristics. Examples of usable protein supplements include soy flour, soy isolates, nonfat milk solids, whey products, fish protein concentrates, cottonseed flour, chick-pea flour, seasame seed flour, cornsoy-milk blend flour, wheat protein concentrate, wheat glutten, defatted wheat germ. Torula yeast, wheat soy blend flour, edible single cell proteins compatible with wheat flour for baking purposes, and mixtures of two or more of the above materials. Generally, the quantity of protein supplement added need not significantly exceed that required to furnish a quantity of protein provided by the wheat flour content of the dough.

It is therefore the primary object of the present invention to provide a unique process for permitting non-wheat grain or tuber flours or starches to be incorporated in wheat flour based bread, baked or fried goods doughs at relatively high levels which would deleteriously affect the quality of the products prepared from the supplemented dough if it were not for the presence of an additive comprising effective amounts of either a sodium salt of acyl lactylates of $C_{14}$–$C_{22}$ fatty acids or an ethoxylated glyceride such as polyoxyethylene (20) mono- and diglycerides of $C_{14}$–$C_{18}$ fatty acids.

It is a further important object of the invention to provide a method of permitting incorporation of non-wheat grain or tuber flours or starches in bread, baked or fried dough goods at significant levels in place of a part of the normal wheat flour content of the product or as a supplement thereto without altering in any way the processing conditions required for preparation of the goods, in the baking or frying processes themselves or in the equipment needed for mixing and processing of the dough.

As a corollary to the foregoing object, it is an important aim of the invention to provide a novel method for permitting incorporation of non-wheat grain or tuber flours or starches in wheat flour based bread, baked or fried goods doughs in a manner which is equally applicable to straight dough, short-time dough, no-time dough, sponge dough or continuous dough processes without significant alteration if any of the conventional sequenece of steps involved therein.

A further object of the invention is to provide a novel process permitting incorporation of high levels of non-wheat grain or tuber flours or starches in wheat flour based bread, baker or fried goods doughs by virtue of the inclusion of a sodium stearoly lactylate or ethoxylated glyceride additive in the dough and which especially lends itself to preparation of special blends or premixes which may be sold as such to food processors or direct to consumers.

In accordance with the preferred concepts of the present invention, incorporation of from 0.1% to 3% (baker's weight) of sodium stearoly-2-lactylate or the ethoxylated mono- and diglycerides of $C_{14}$–$C_{18}$ fatty acids (polyoxyethylene (20) mono- and diglycerides of the fatty acids), in a wheat flour based bread, baked or fried dough product composition permits incorporation of a non-wheat grain or tuber flour or starch in the dough in an amount sufficiently high that the quality of the product produced from the dough formulation would be adversely affected if it were not for the provision of the lactylate or ethoxylated glyceride additive therein. For example, up to 40% (baker's weight) of the non-wheat grain or tuber flour or starch including wheat starch may be added to the dough if desired, and at the same time a non-wheat or wheat protein supplement may be incorporated therein in an amount at least as high as that quantity which provides an amount of protein approximately equal to the protein content of the wheat flour. The preferred additive is sodium stearoyl-2-lactylate with best results being obtained when 0.5 part by weight of the lactylate is provided for each 100 parts of wheat flour in the dough. Similarly, the preferred amount of ethoxylate glyceride additive is also 0.5 part by weight (baker's weight).

Although as explained, the discovery that addition of prescribed amounts of a lactylate additive such as sodium stearoyl lactylate or an ethoxylate glyceride additive such as polyoxyethylene (20) mono- and diglycerides of $C_{14}$–$C_{18}$ fatty acids is useful in permitting incorporation of non-wheat flour supplements of various types in wheat flour based bread, baked and fried dough products, the additive also serves the related function of permitting significant protein supplementation of the food materials. The effectiveness of the lactylate or ethoxylated glyceride additive can best be illustrated with respect to bread formulations because of the ease with which the products can be produced, the wide range of standard comparative tests which can be employed to show the value of introducing the additive into the bread dough as compared with similar formulations without the additive, the simple way in which the optimum use concentration thereof can be established, and the reproducible nature of the tests for verification purposes.

Bread dough is usually made up of relatively simple ingredients including wheat flour, water, salt, yeast, sugar, and in some instances shortening and a dough conditioner. In a typical straight dough formula, for each 100 parts of wheat flour, 3 parts of yeast, 5 parts of sugar, 2 parts of salt, 10 to 60 parts per million of potassium bromate and sufficient water for optimum absorption, are combined to produce a plastic dough. It has now been discovered that by incorporation of from 0.1% to 3% (preferably 0.5%) of sodium stearoyl lactylate (preferably polyoxyethylene (20) mono- and diglycerides of $C_{14}$–$C_{18}$ fatty acids) in the formulation, up to 40% (baker's weight) of a non-wheat grain or tuber flour or starch may be incorporated into the dough without adversely affecting the organoleptic and physical properties of the bread prepared therefrom. Any one of the non-wheat grain or tuber flours or starches previously mentioned may be added to the formulation, or if desired, combinations of such non-wheat flour supplements may be introduced into the dough. In addition, if desired, a protein supplement such as one of those previously listed, or combinations thereof, may be introduced into the bread dough as a supplement thereto. Use of from 0.1% to 3% of either a sodium salt of an acyl lactylate of $C_{14}$–$C_{22}$ fatty acids or a mono- glyceride as specified permits incorporation of a wide range of non-wheat flour or protein additives, or mixtures of the two at various levels of addition, in the bread, or baked or fried goods dough with the amount of lactylate or monoglyceride required being somewhat dependent upon the amount of supplements to be introduced into the formulation. In most instances though, utilization of the preferred amount of lactylate or monoglyceride additive, i.e. 0.5% (baker's weight) is adeqaute to permit introduction of about 40% of a non-wheat flour or starch, or in conjunction therewith, an amount of a protein supplement sufficient to provide an absolute protein content approximately equal to the absolute protein value of the wheat flour normally provided in the product. It is also to be noted that use of the lactylate or ethoxylated glyceride additive permits the shortening to be eliminated from the bread formulation if desired without altering the properties of the bread. In high shortening wheat flour based goods such as doughnuts and the like, the shortening requirement is reduced by three-fourths or more by inclusion of the lactylate or ethoxylated glyceride additive in the formulation.

When bread is prepared by the standard straight dough method as prescribed by the American Association of Cereal Chemists with slight modifications and using a formula comprising in parts by weight, 100 parts of wheat flour, 3 parts of yeast, 5 parts of sugar, 2 parts of salt, 40 parts per million of potassium bromate, 40 parts of corn starch, 0.5% of sodium stearoyl-2-lactylate, the resulting bread product compares very favorably with bread made from the same formula without the non-wheat flour supplement and lactylate additive. In addition, the apperance, crumb texture, grain and organoleptic properties of the two breads are similar. The bread in each case was prepared by mixing the ingredients for a time period sufficient to produce optimum development. 500 grams of dough from each batch were scaled and rounded up. The dough was then allowed to rest for 40 minutes at 86° F. Next, the dough was molded and panned, and proofed at 90° to height. Finally, the test samples were baked at 450° F. for 25 minutes.

Similar tests conducted using wheat starch, corn flour, rice flour and rye flour in place of the specified amount of corn starch produced equivalent results. Variations of the level of the non-wheat flour supplement did not adversely affect the organoleptic or physical properties of the bread at supplementation levels of 30% and 20% respectively (baker's weight) with all products having a "specific loaf volume" exceeding 6.00 cc./g. (regarded in the industry as a minimum volume for a marketable bread product).

Baking tests also established that supplementation of the bread formulation with a protein material in addition to the non-wheat flour supplement did not adversely affect the bread product when the level of protein additive is maintained approximately at a level to offset the protein dilution attributable to inclusion of the non-wheat supplement in the formula. For example, when 17 parts (baker's weight) of corn starch and 8 parts (baker's weight) of soy flour was added to the typical straight dough bread formulation set forth above, it was found that the protein and starch supplements had no significant effect on the specific loaf volume of the bread or on the other properties which are scored in determining the quality of the bread, so long as the lactylate or ethoxylated glyceride additive was included in the dough. Similarly, a bread product comparable to one containing wheat flour without protein and starch supplementation can be prepared by including 25 parts of corn starch (baker's weight) and 5 parts of soy flour (baker's weight) along with 0.5% ethoxylated glyceride or lactylate additive. These examples illustrate that a wide range of combinations of non-wheat flour and protein supplements may be satisfactorily combined, but it is to be recognized that in most instances as the proportion of starch or equivalent supplement is increased, the level of protein supplement should be correspondingly decreased. A desirable goal is to have the protein content of the combination similar to that of wheat flour.

The lower limit of supplementation of a wheat flour based bread, baked or fried dough product with a non-wheat grain or tuber flour or starch material which does not require addition of the sodium stearoyl lactylate or monoglyceride additive is that amount which does not adversely affect the finished product in the absence of the lactylate or monoglyceride. Generally speaking, the quantity of non-wheat flour supplement which may be added to the dough formulation without inclusion of the lactylate or monoglyceride additive does not exceed more than about 3% (baker's weight). Similarly, about 40% of the supplement is the usual upper limit of supplement which may be added to produce a commercial product comparable in properties to bread, baked or fried dough goods without the non-wheat flour supplement and the lactylate or monoglyceride additive. Regardless of the proportion of non-wheat flour supplement added though, the sodium salt of an acyl lactylate of $C_{14}$–$C_{22}$ fatty acids or the ethoxylated glyceride additive improves the quality of the final product. The upper limit of protein supplementation along with the addition of a non-wheat flour supplement and the acyl lactylate or glyceride additive to the formula is usually dictated primarily by economic considerations. Normally, it is not essential to go above about 12% by weight of protein added to the final bread, baked or fried dough products.

The process and composition of this invention uniquely lends itself to preparation of premixes containing the lactylate or ethoxylated glyceride additive combined with various non-wheat flour or protein supplements. It can be appreciated in this respect that an almost limitless number of blends insofar as constituents and relative proportions thereof may be produced and distributed to meet various marketing requirements and considerations.

Sodium stearoyl-2-lactylate is generally prepared by admixing lactic acid in an aqueous medium to commercial grade stearic acid (an admixture of myristic, palmitic and stearic fatty acids) at a sufficiently elevated temperature to remain in a molten condition. In general, 1.0 equivalent of fatty acid is used for each 1.2 equivalents of lactic acid as monomer for each lactyl group desired. In this case therefore 2.4 equivalents of lactic acid are provided for each 1.0 equivalent of fatty acids. The mixture is stirred with heating whereupon about 1 equivalent of sodium hydroxide is added. The mixture is then heated to bring the temperature thereof up to about 200° C. to complete the reaction. The reaction is carried out under an atmosphere of an inert gas to remove water vapor and prevent oxidation of the stearic acid. A solid, slightly cream colored material is produced upon cooling of the reaction products and it is then ground to a fine powder for use. The powder is a mixture of sodium salts of a homologous series of stearoyl lactylic acids, in which the number of lactyl groups in the molecule is a function of the relative ratios of the constituents brought into admixture.

The reaction mixture will contain unreacted lactic acid and lactylates, unreacted stearic acid, polylactylates and their salts. A specific procedure for producing sodium stearoyl-2-lactylate of which the numeral 2 indicates the average number of lactyl groups in the molecule, is set forth in detail in U.S. Pat. No. 2,789,992 insofar as stearoyl-2-lactylic acid ester is concerned and Pat. No. 2,733,252 which described the preparation of sodium stearoyl-2-lactylate from stearic acid, sodium bicarbonate and lactylic acid. It is to be understood in this respect that although best results have been obtained by using sodium stearoyl-2-lactylate, other equivalent lactylates may be employed in this invention including those stearoyl lactylates, and particularly the sodium lactylates having a different average number of lactyl groups in the molecule than is the case in the preferred lactylate additive specified herein. For example, the average number of lactyl groups can be less than 1.0 although a larger quantity of the additive must be employed for equivalent effectiveness. Specifications for the preferred acyl lactylate sodium stearoyl-2-lactylate are set forth in food additive regulation 21 CFR § 121.1211.

The ethoxylated glyceride additive which can be used in lieu of the acyl lactylates specified to obtain equivalent results is described in detail in U.S. Pat. No. 3,490,918 and particularly in Example I thereof. As is clear from the disclosure of such patent, the glyceride additive is commonly referred to as a monoglyceride product but is in fact a mixture primarily made up of ethoxylated mono- and diglycerides combined with very minor amounts of triglycerides and glycerine. The additive is prepared from hydrogenated tallow (or hydrogenated soy bean oil) by reacting the mixture of $C_{14}$–$C_{18}$ fatty acids with glycerine in the presence of potassium hydroxide. The crude "monoglyceride" thus prepared is reacted with ethylene oxide and the reaction products neutralized and a filtrate removed (ethoxylated "monoglyceride" (20 mole adduct) having an ethylene oxide content of from about 60% to 68% on an anhydrous basis. The hydroxyl value is between 65–80, the saponification number between 65–75 and the acid value below 2.

As indicated in Pat. No. 3,490,918, although the preferred glyceride additive is derived from hydrogenated tallow or its equivalent, the "monoglyceride" can be produced from a number of fatty acids or mixtures thereof containing from 10–24 but preferably 14–18 carbon atoms. The fatty acids can be saturated or unsaturated but are preferably saturated. The polyoxyethylene content of the additive can vary widely, i.e. from 10–95% on a weight basis. A more preferred content is from 25–80% with optimum results being obtained from a 45–75% range. Thus the additive comprises the condensation product of from 10–95 parts by weight of ethylene oxide and correspondingly from 90–5 parts by weight of a partial glycerol ester of a $C_{10}$–$C_{24}$ fatty acid containing at least 10 percent monoglyceride content with diglycerides, triglycerides and glycerine constituting the balance. Specifications for the preferred ethoxylated glyceride additive are set forth in food additive regulation 21 § CFR 211.1221.

Having thus described the invention, what is claimed as new and desired to be secured by Letters Patent is:

1. A composition for preparing wheat flour based bread, baked or fried dough products containing a significant amount of a non-wheat flour, or starch ingredient comprising, in combination:
   a quantity of wheat flour;
   a quantity of a supplement selected from the group consisting of non-wheat grain flours, grain starches, tuber flours, tuber starches, wheat starch, and pregelatinized forms thereof; and
   from about 0.1% to 3% by weight based on the total weight of said wheat flour contained in the composition of an additive selected from the group consisting of sodium salts of acyl lactylates of $C_{14}$–$C_{22}$ fatty acids, and the condensation product of from 10–95 parts by weight ethylene oxide and correspondingly from 90–5 parts by weight of a partial glycerol ester of a $C_{10}$–$C_{24}$ fatty acid containing at least 10 weight percent monoglyceride content with diglycerides, triglycerides and glycerine the balance, the quantity of said supplement being at a level sufficient to deleteriously affect the quality of a product prepared from said composition in the absence of said additive in the dough.

2. A composition as set forth in claim 1, wherein said additive comprises sodium stearoyl-2-lactylate.

3. A composition as set forth in claim 1, wherein said additive comprises polyethylene (20) mono- and diglycerides of $C_{14}$–$C_{18}$ fatty acids.

4. A composition as set forth in claim 1, wherein the amount of said supplement comprises at least about 3% flour weight of the total weight of the product prepared from said composition.

5. A composition as set forth in claim 1, wherein the amount of said supplement comprises about 30% flour weight of the total weight of the product prepared from said composition.

6. A composition as set forth in claim 1, wherein the amount of said supplement comprises up to about 40% flour weight of the total weight of the product prepared from said composition.

7. A composition as set forth in claim 1, wherein said supplement is selected from the group consisting of rye flour, barley flour, corn flour, cassava flour, yam flour, potato flour, rice flour, wheat starch, yam starch, corn starch, cassava starch, rice starch, potato starch, pregelatinized starches of any of the preceding supplement sources, pregelatinized flours of any of the preceding supplement sources, and mixtures thereof.

8. A composition as set forth in claim 7, wherein said supplement is corn flour.

9. A composition as set forth in claim 7, wherein said supplement is cornstarch.

10. A composition as set forth in claim 7, wherein said supplement is cassava flour.

11. A composition as set forth in claim 7, wherein said supplement is rye flour.

12. A composition as set forth in claim 7, wherein said supplement is potato flour.

13. A composition as set forth in claim 1, wherein is provided about 0.5% flour weight of said additive.

14. A composition as set forth in claim 1, wherein is included a quantity of a protein constituent other than wheat flour but compatible therewith in the preparation of said bread, baked or fried dough products therefrom.

15. A composition as set forth in claim 14, wherein said constituent is selected from the group consisting of soy flour, soy isolates, nonfat milk solids, whey products, fish protein concentrate, cottonseed flour, chick-pea flour, sesame seed flour, corn-soy-milk blend flour, wheat protein concentrate, wheat gluten, defatted wheat germ, Torula yeast, wheat-soy-blend flour, edible single-cell proteins, and mixtures thereof.

16. A method of incorporating a significant amount of a non-wheat flour or starch ingredient into bread, baked or fried goods dough containing wheat flour without affecting the quality of a product prepared therefrom, said method comprising the steps of:
   adding to the dough prior to baking thereof a quantity of a supplement selected from the group consisting of non-wheat grain flours, grain starches, tuber flours, tuber starches, wheat starch, and pregelatinized forms thereof; and including in the dough from about 0.1% to 3% by weight based on the total weight of said wheat flour contained in the dough of an additive selected from the group consisting of sodium salts of acyl lactylates of $C_{14}$-$C_{22}$ fatty acids, and the condensation product of from 10–95 parts by weight ethylene oxide and correspondingly from 90–5 parts by weight of a partial glycerol ester of a $C_{10}$-$C_{24}$ fatty acid containing at least 10 weight percent monoglyceride content with diglycerides, triglycerides and glycerine the balance;

the quantity of said supplement added being at a level sufficient to deleteriously affect the quality of a product prepared from said dough in the absence of said additive therein.

17. A method as set forth in claim 16, wherein said step of including an additive in the dough comprises adding sodium stearoyl-2-lactylate thereto.

18. A method as set forth in claim 16, wherein said step of including an additive in the dough comprises adding polyoxyethylene (20) mono- and diglycerides of $C_{14}$-$C_{18}$ fatty acids.

19. A method as set forth in claim 16, wherein said step of adding a supplement to the dough comprises adding a material selected from the group consisting of rye flour, barley flour, corn flour, cassava flour, yam flour, potato flour, rice flour, wheat starch, yam starch, corn starch, cassava starch, rice starch, potato starch, pregelatinized flours of any of the preceding supplement sources, pregelatinized starches of any of the preceding supplement sources, and mixtures thereof.

20. A method as set forth in claim 16, wherein is included the step of adding a quantity of a protein constituent other than wheat flour but compatible therewith in the preparation of said bread, baked or fried dough products therefrom.

References Cited

UNITED STATES PATENTS 3,490,918   1/1970   Egan et al. ........... 99—123 X

OTHER REFERENCES

Jongh et al.: "Bread Without Gluten," The Bakers Digest, vol. 42, June 1968, pp. 24–29.

Tenney et al.: "Sodium Stearoyl-2 Lactylate," The Bakers Digest, vol. 42, December 1968, pp. 38–42.

RAYMOND N. JONES, Primary Examiner

J. R. HOFFMAN, Assistant Examiner

U.S. Cl. X.R.

99—80, 83, 86, 90 S, 90 NS, 92, 94